United States Patent
Barron et al.

(10) Patent No.: US 7,717,250 B2
(45) Date of Patent: May 18, 2010

(54) TUNABLE CENTRIFUGAL CLUTCH

(75) Inventors: Brenton H. Barron, Corning, NY (US); Steven M. Averill, Beaver Dams, NY (US); Benjamin J. Heater, Corning, NY (US)

(73) Assignee: The Hilliard Corporation, Elmira, NY (US)

( * ) Notice: Subject to any disclaimer, the term of this patent is extended or adjusted under 35 U.S.C. 154(b) by 597 days.

(21) Appl. No.: 11/649,154

(22) Filed: Jan. 3, 2007

(65) Prior Publication Data

US 2008/0156609 A1    Jul. 3, 2008

(51) Int. Cl.
  *F16D 43/18*  (2006.01)
(52) U.S. Cl. .......................... 192/105 BA; 192/103 B; 192/110 R
(58) Field of Classification Search ........... 192/105 BA, 192/105 BB, 103 B
  See application file for complete search history.

(56) References Cited

U.S. PATENT DOCUMENTS

| | | | | |
|---|---|---|---|---|
| 1,859,963 | A * | 5/1932 | Futscher | 192/105 A |
| 2,886,154 | A | 5/1959 | Conlee | 192/105 BA |
| 3,026,980 | A | 3/1962 | Hoff | 192/105 BA |
| 3,610,382 | A | 10/1971 | Makinson | 192/105 BA |
| 3,687,254 | A * | 8/1972 | Bystrom | 192/105 A |
| 4,625,849 | A | 12/1986 | Gommel | 192/105 BA |
| 4,819,779 | A * | 4/1989 | Nickel et al. | 192/105 BA |
| 5,280,828 | A | 1/1994 | Reynoso et al. | 188/184 |
| 6,309,317 | B1 | 10/2001 | Joss | 474/13 |

(Continued)

OTHER PUBLICATIONS

Max-Torque web-site materials, http://www.maxtorque.com, 14 pages total, including:—Max-Torque homepage, http:/maxtorque.com/, 1 page;—Max-torque clutches, http:/maxtorque.com/html/clutches.html, 2 pages;—"SS (Six Shoe) Clutch", http:/maxtorque.com/html/ss_clutch.html, 1 page;—"Max-Torque 4-Cycle Racing Clutches", http://www.maxtorque.com/html/racing.html, 5 pages; and—"Selection Manual", http://www.maxtorque.com/lehane/html/selection.html, 5 pages.

(Continued)

*Primary Examiner*—Richard M. Lorence
(74) *Attorney, Agent, or Firm*—Drinker Biddle & Reath LLP (57) ABSTRACT

A centrifugal clutch is disclosed including a driver adapted to engage and to be rotated by an input shaft, a drum adapted to engage a driven component, a plurality of shoes located between the driver and the drum, and a plurality of springs, each spring engaged with adjacent shoes for urging the shoes together. The shoes are radially movable between an outward position in which the shoes contact the drum and an inward position in which the shoes are spaced apart from the drum. Each shoe has an asymmetrical contacting member for engaging the drum, the contacting member having a toe protruding circumferentially therefrom in one direction. Each shoe is capable of being independently installed into the clutch with the toe of the contacting member facing either towards or away from the direction of rotation of the driver, provided that the driver remains rotationally balanced. The contacting member of each shoe further includes one or more cavities each adapted to receive at least one weight to enable adjustment of the mass of each shoe and the mass distribution within each shoe.

23 Claims, 6 Drawing Sheets

U.S. PATENT DOCUMENTS 6,857,515 B2     2/2005     Barron et al. ......... 192/105 BA
2004/0211642 A1     10/2004     Barron et al. ............... 192/105

OTHER PUBLICATIONS

"Centrifugal Clutches", Comet Industries, http://www.tecumsehuk.co.uk/cometmc.htm, 2 pages.

"Centrifugal Clutches", Noram web site materials, http://www.noram-clutch.com/clutches.htm, total 20 pages, including:—Noram Clutches home page, http://www.noram-clutch.com/clutches.htm, 1 page;—"Cheetah", http://www.noram-clutch.com/clutchesracing.html, 2 pages;—"GE Ultimate", http://www.noram-clutch.com/clutchesracinggeultimate.html, 2 pages—"GE Ultimate" specification sheet, http://www.noram-clutch.com/geultimatespecs.html, 1 page;—"Centrifugal Clutches", http://www.noram-clutch.com/clutchescentrifugal.html, 2 pages—"Tri-Lobe / 3700 Series", http://www.noram-clutch.com/clutchtrilobe.html, 2 pages—"70 Series", http://www.noram-clutch.com/clutch70series.html, 2 pages—"4000 Series", http://www.noram-clutch.com/clutch4000series.html, 2 pages;—"War Eagle Series", http://www.noram-clutch.com/clutchwareagleseries.html, 2 pages;—"1600 Series", http://www.noram-clutch.com/clutchescentrifugal1600.html, 2 pages;—"1800 Series", http://www.noram-clutch.com/clutch1800series.htm, 2 pages.

* cited by examiner

TUNABLE CENTRIFUGAL CLUTCH

FIELD OF THE INVENTION

The present invention relates to centrifugal clutches, and more particularly to an improved centrifugal clutch design having adjustable shoes and weights for tuning the performance of the clutch.

BACKGROUND OF THE INVENTION

A centrifugal clutch typically includes a driver or impeller configured so as to be rotated about an axis by an external power or driving source, a hollow drum coaxial with and disposed about the driver and configured to drive an external load, and one or more shoes located within the drum that are rotated relative to the drum by the driver. One such clutch is disclosed in U.S. Pat. No. 6,857,515, which is incorporated herein by reference in its entirety.

The shoes are generally adapted to move radially into and out of frictional engagement with the inside of the drum. The frictional engagement with the drum provides load transmission between the driver and the drum. The shoes are typically urged towards the center, away from the drum, by one or more springs. As the driver and the shoes rotate about the axis, the centrifugal force created by the rotation urges the shoes radially outward. When the speed of rotation is sufficiently high, the centrifugal force acting on the shoes overcomes the force of the springs, urging the shoes to move outward to engage the drum. The engagement of the shoes with the drum causes the drum, and thus, the external load, to rotate in combination with the shoes. The speed at which the clutch engages is, therefore, determined by a balance between the mass of the shoes and the strength of the springs.

Centrifugal clutches are commonly used in the drive trains of machines powered by small internal combustion engines for producing varying amounts of horsepower. These types of clutches have particular use in lower horsepower machines, such as wood chippers and go-karts, which typically operate at up to about 40 hp. Particularly with regard to racing go-karts, there are several benefits to having a readily adjustable clutch. Each racetrack may be different due to the length of the track, the material from which the track is composed, the banking of the turns, the radius of the turns, and the temperature and dampness conditions on the track at the time of racing. All of these factors may require tuning or adjustment of a go-kart clutch for optimum performance, so that the engine can be maintained in the power band. Additionally, track conditions may change throughout the race, due to changes in temperature and weather. Therefore, it is apparent that a clutch capable of being easily and quickly adjustable would advantageous for go-kart racing.

The clutch is typically set to disengage when the engine is idling, and to engage when the engine is generating sufficient torque to drive the load effectively. Because the engagement between the shoes and the drum is based on friction, a certain amount of slippage is inherent, and in some cases is actually required, in the operation of the clutch. For example, when the centrifugal force first overcomes the spring force, the initial contact between the moving shoe and the stationary drum will result in slippage. As the speed of the motor increases, the centrifugal force should eventually produce sufficient friction to prevent slippage. Until that speed is attained, there will be relative movement between the shoes and the drum. This slippage is necessary to some degree to provide for a gradual acceleration of the driven component.

In some applications, it is desirable to have a clutch whose performance characteristics can be readily adjusted depending on operating conditions. The performance characteristics of a clutch, including the speed at which the shoes engage the drum, the amount of torque that can be transmitted between the shoes and the drum, and the character of initial engagement and subsequent slippage between the shoes and the drum, is dependent on several factors. These factors may include the mass of the shoes, the strength of the springs, the geometry of the shoes, and the mass distribution within each shoe. In one example, the use of heavier shoes and lighter springs will generally result a lower engagement speed and a higher torque capacity with less slippage at the same external load. In another example, a shoe having a geometry or density whereby its mass is biased towards its leading edge and away from its trailing edge will generally result in a more aggressive engagement of the clutch that may provide a higher torque capacity with less slippage. It can be appreciated that various combinations of these several factors may be adjusted to fine-tune the performance of a clutch to a particular application under particular operating conditions.

SUMMARY OF THE INVENTION

Accordingly, it is an object of the present invention to provide a clutch having shoes whose mass can be easily adjusted, for example by the addition or removal of various different weights. It is another object of the present invention to provide a clutch having springs that can be easily interchanged with other springs having various different strengths. It is yet another object of the present invention to provide a clutch having shoes that may be easily reoriented to vary the geometry of the engagement between the shoes and the drum. It is a further object of the present invention to provide a clutch having a means to adjust the center of mass of the shoes with respect to the leading and trailing edges thereof.

The present invention provides a centrifugal clutch whose performance characteristics may be readily adjusted and fine-tuned to adapt to various operating conditions. The clutch includes a driver that has a central axis about which it can rotate. The driver is adapted to engage with an input shaft. A drum is disposed coaxially about the driver and is adapted to engage an output drive component. A plurality of shoes are located between the driver and the drum and are arranged about the axis. The shoes are radially movable between an outward position in which the shoes contact a surface of the drum and an inward position in which the shoes are spaced apart from the drum. The driver is preferably a hub that includes radial teeth or projections which extend into recesses formed in each shoe. When the clutch is not engaged, the shoes are retained inwardly relative to the hub. During operation when the clutch is engaged, the shoes translate radially outwardly relative to the hub, guided by the teeth, to engage the inner surface of the drum.

Each shoe includes a drum contact member which is adapted to contact the drum and support which preferably includes a pair of legs. Each leg has one end attached to the drum contact member and the other end extending radially inwardly. The support further includes a recess formed between the legs, the recess being adapted to mate with at least one of the radial teeth or projections that extend outwardly from the hub. A spring attachment mount is preferably formed on the radially inward end of the each leg. Adjacent shoes are preferably connected to one another through at least one spring. In one embodiment, the spring has two opposed ends, each end engaging with the spring attachment mount on the leg of a shoe. The spring urges the adjacent shoes toward one another. In a preferred embodiment, the spring is a C-shaped spring with first and second ends, and the spring attachment mount on each leg includes a retention lip with a bulbous or edge portion that is designed to retain an end of the spring on the leg. Various strength springs may be used to alter the forced with which the shoes are urged radially inward to oppose the centrifugal force of rotation.

The drum contact member is preferably asymmetric, having a toe extending circumferentially outward with respect to one side of the shoe and an opposed heel that is substantially flush with the other side of the shoe. Because of the symmetric legs, the shoes can be installed onto the hub in either a leading or trailing configuration. The toe travels in front of the heel of the rotating shoe in the leading configuration, whereas the toe travels behind the heel of the rotating shoe in the trailing configuration. A leading shoe generally causes more aggressive clutch engagement, while a trailing shoe generally causes less aggressive clutch engagement. In one embodiment, all shoes may be installed in a leading configuration, and in another embodiment, all shoes may be installed in a trailing configuration. In yet another embodiment, a number of the shoes may be installed in a leading configuration and the remainder of the shoes may be installed in a trailing configuration, provided that diametrically opposed shoes are similarly oriented with respect to each other.

The drum contact member preferably includes one or more cavities, each cavity being adapted to receive a weight. The drum contact member preferably has at least two cavities, and in a preferred embodiment, the drum contact member has three cavities. Each cavity may be left vacant or may be filled with one of a number of weights having different densities or masses, enabling a user to selectively increase or decrease the mass of the shoe and alter the distribution or balance of mass in the shoe. A heavier shoe generally engages at a lower speed and results in less slippage for a given torque loading. A shoe balanced toward the leading edge generally engages more aggressively and results in a higher torque capacity.

The ability to independently and easily adjust the shoe mass, the shoe orientation, the spring force, and the mass distribution within each shoe yields a number of combinations to provide a clutch that can be adapted to a variety of operating conditions. By adjusting these parameters, individually or in combination, and for all shoes simultaneously or only for some shoes, the performance characteristics of the clutch of the present invention can be adjusted to achieve a range of engagements speeds, torque capacities, and initial engagement and slippage qualities.

Other objects, advantages, and features of the present invention will become apparent to those skilled in the art upon reading the following detailed description, when considered in conjunction with the appended claims and the accompanying drawings briefly described below. As will be realized, the invention is capable of modifications in various respects, without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention that is presently preferred. However, it should be understood that this invention is not limited to the precise arrangements and instrumentalities shown in the drawings.

DESCRIPTION OF THE INVENTION

Figure 1:
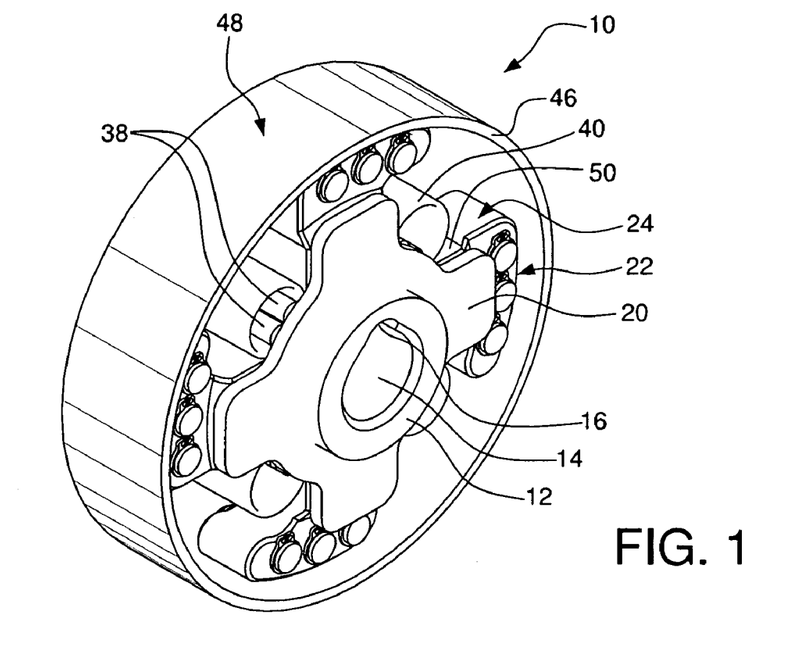
FIG. 1 is an isometric view of an embodiment of the clutch of the present invention.
Figure 2:
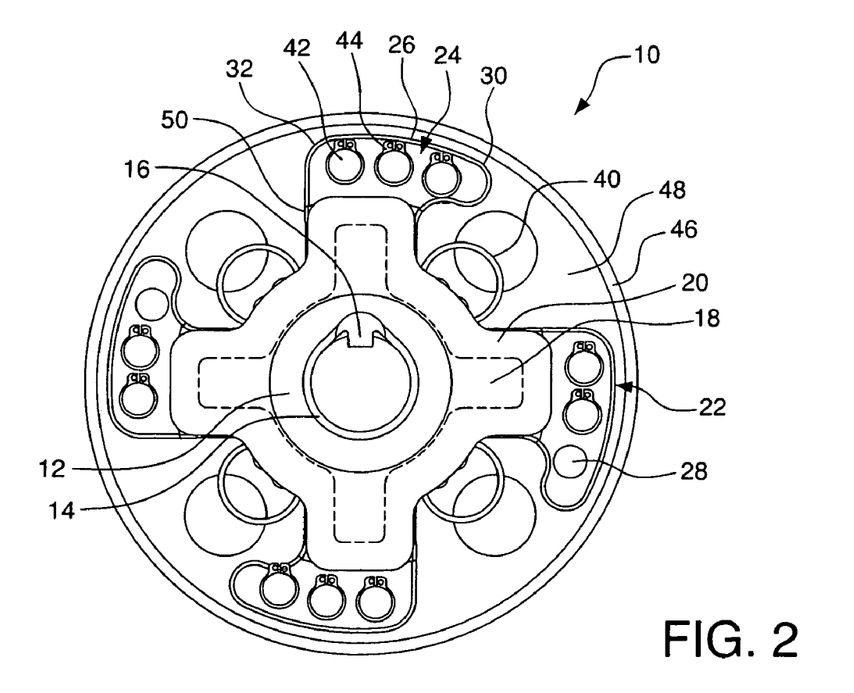
FIG. 2 is a front view of the clutch of FIG. 1.

Referring to the drawings, wherein like numerals identify like elements throughout the several views, there is illustrated in FIGS. 1, 2 an embodiment of the centrifugal clutch 10 according to the present invention. The clutch 10 includes a driver or hub 12. The hub 12 is preferably annular with a central opening or bore 14, which is preferably cylindrical in shape. The bore 14 permits the hub 12 to be mounted on an input shaft (not shown) which transmits rotational motion from an engine or similar driving device, to the hub 12. A locking or engagement mechanism 16 is used to attach the hub 12 to the input shaft. In the illustrated embodiment, the locking mechanism includes a key 16 which is formed integral with the hub 12 and is adapted to mate with a corresponding slot or keyway formed in the input shaft. Other types of locking mechanisms can be used in the present invention, such as splines.

The hub 12 includes a drive mechanism for engaging the hub 12 with one or more clutch shoes 22. In the illustrated embodiment, the drive mechanism includes a plurality of projections or teeth 18 which extend radially outward from the hub 12. The teeth 18 extend along a portion of the axial length of the hub 12. In one embodiment there are four teeth 18, and correspondingly four shoes 22, evenly spaced about the circumference of the hub 12. As will be described in more detail below, when the hub 12 is rotated at a sufficient speed, the shoes 22 engage a drum 48, causing the drum 48 to rotate with the hub 12.

The teeth 18 may be attached to a flange 20 formed on the end of the hub 12. As is evident from FIG. 1, the flange 20 acts to retain the shoes 22 on the hub 12. Each tooth 18 preferably is of uniform cross-section along its axial length, and tapers slightly in the radial direction such that it is narrower at its radially outer tip than at its base where it joins the core of the hub 12. The peripheral edge of the flange 20 preferably has a curvilinear shape with projections in the regions of the teeth 18. The flange 20 is adapted to prevent the shoes 22 from moving axially past the end of the hub 12, while leaving the areas between the teeth 18 and the shoes 22 relatively open for access and ventilation. Various mechanisms may be employed to retain the shoes 22 at the opposite side of the hub 12 from the flange 20. Some such mechanisms are discussed in detail in U.S. Pat. No. 6,587,515, which is incorporated herein by reference in its entirety.

A clutch shoe 22 is slidably seated on each of the teeth 18. As seen in FIGS. 4A to 4H, the shoe 22 has a support 50 extending generally radially inwardly. The support preferably includes two legs 36 bounding a recess 56 adapted for receiving the corresponding tooth 18. The profile of the recess 56 is generally similar to the profile of the tooth 18 on which the shoe 22 is seated so as to provide a relatively close fit therebetween. Preferably, the profile of the recess 56 substantially matches the profile of the tooth 18. In one embodiment, the taper of the recess 56, and according taper of the tooth 18, is approximately five degrees. The length of the legs 36, and thus the radial depth of the recess 56, is preferably sized such that when the shoe 22 is seated on a tooth 18, the legs 36 contacts the hub 12. Further, the length of the tooth 18 and the depth of the recess 56 are sized such that the legs 36 remain on either side of the tooth 18 when the shoes 22 are forced radially outward to be engaged with the drum 48.

As is best seen in FIG. 2, each shoe 22 has a drum contact member or body 24, which includes an arcuate outer friction surface 26. The shape of the arcuate surface 26 is designed to conform to the inner surface of the drum 48, as is conventional in the art. In one embodiment, the drum contact member 24 defines an arc of approximately 45 degrees, although other arcuate lengths can be used in the present invention. As shown in FIGS. 1 to 3C, this embodiment permits four shoes to cover about half of the inner circumference of the clutch drum 48 while leaving gaps between adjacent shoes 22.

Figure 3A:
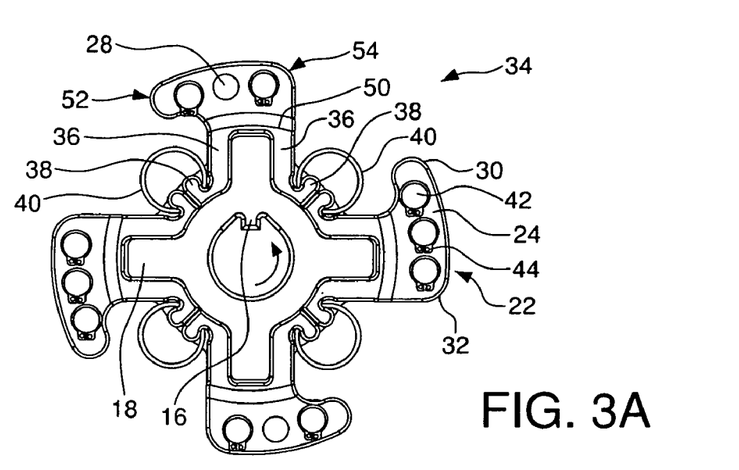
FIG. 3A is a partial front view of the clutch of FIG. 1, showing an embodiment of the rotor having the toes at the leading edge of the shoes and having shoes with a combination of different numbers of weights.
Figure 3B:
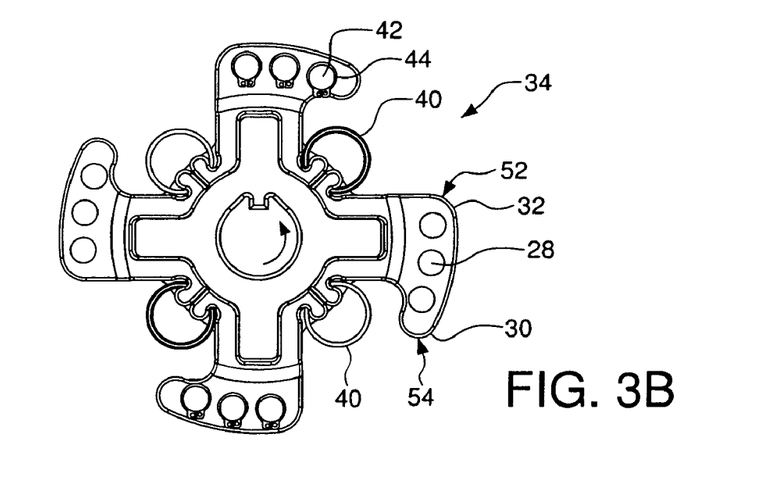
FIG. 3B is a partial front view of the clutch of FIG. 1, showing an embodiment of the rotor having the toes at the trailing edge of the shoes and having a combination of different strength springs.
Figure 3C:
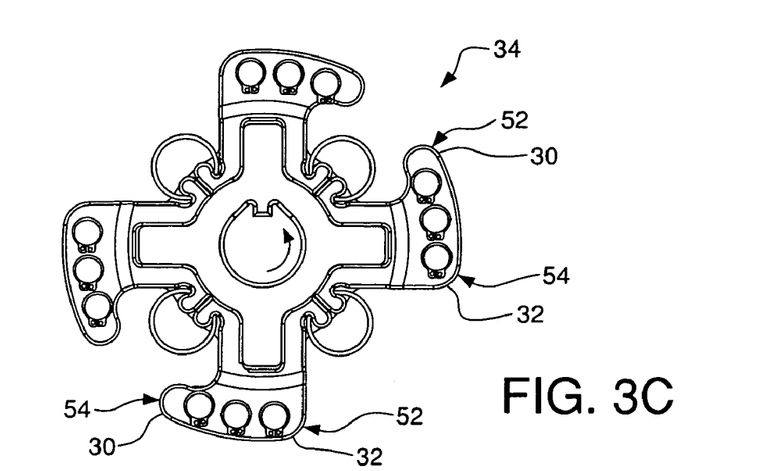
FIG. 3C is a partial front view of the clutch of FIG. 1, showing an embodiment of the rotor having the a mixture of leading edge and trailing edge shoes.
Figure 4A:
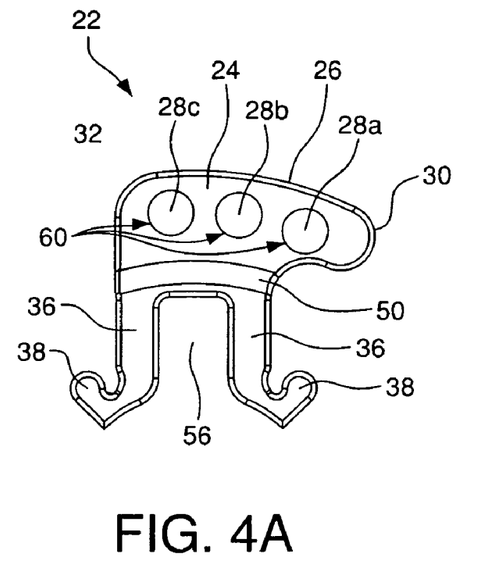
FIG. 4A is a front view of a shoe of the clutch of FIG. 1, showing no weights disposed in the shoe.
Figure 4B:
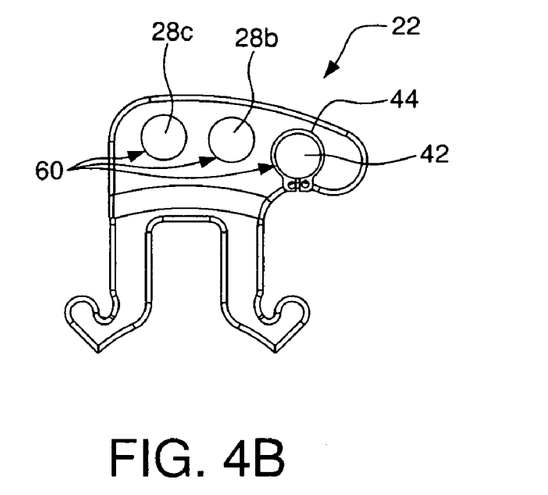
FIG. 4B is a front view of a shoe of the clutch of FIG. 1, showing one weight disposed at the toe.
Figure 4C:
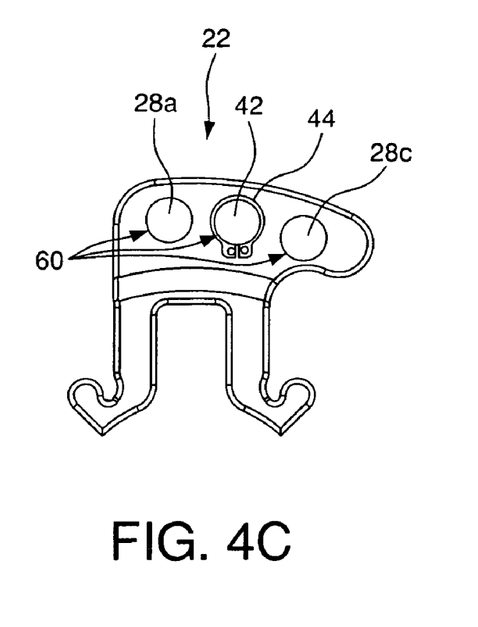
FIG. 4C is a front view of a shoe of the clutch of FIG. 1, showing one weight disposed at the middle.
Figure 4D:
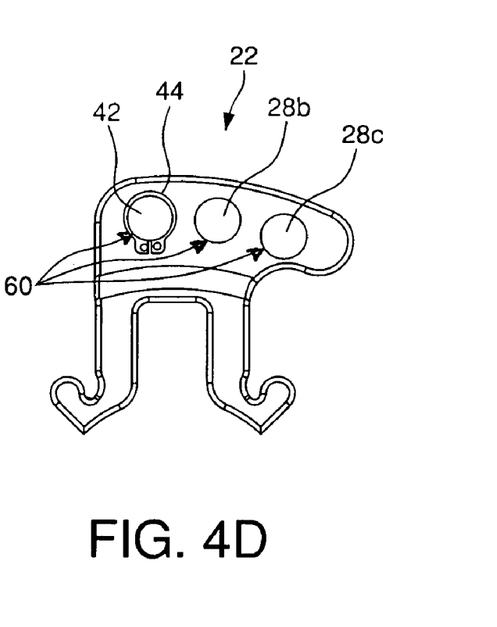
FIG. 4D is a front view of a shoe of the clutch of FIG. 1, showing one weight disposed at the heel.
Figure 4E:
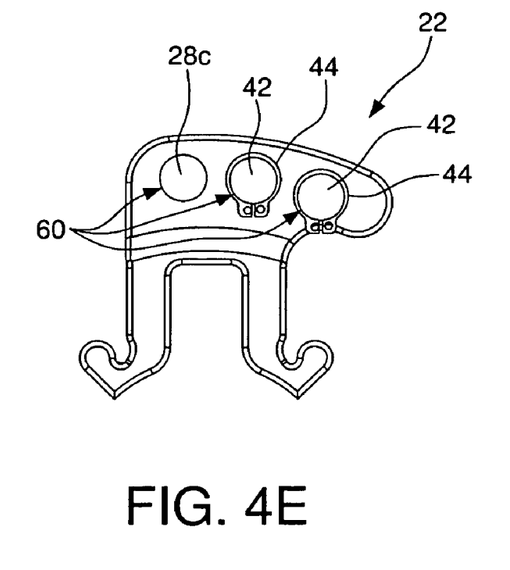
FIG. 4E is a front view of a shoe of the clutch of FIG. 1, showing one weight disposed at the toe and one weight disposed at the center.
Figure 4F:
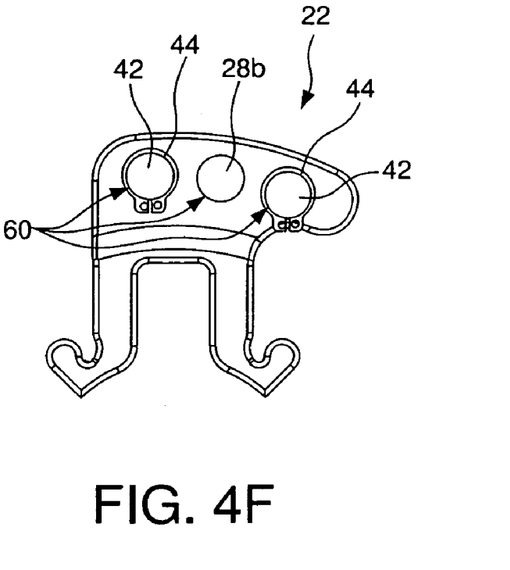
FIG. 4F is a front view of a shoe of the clutch of FIG. 1, showing one weight disposed at the toe and one weight disposed at the heel.
Figure 4G:
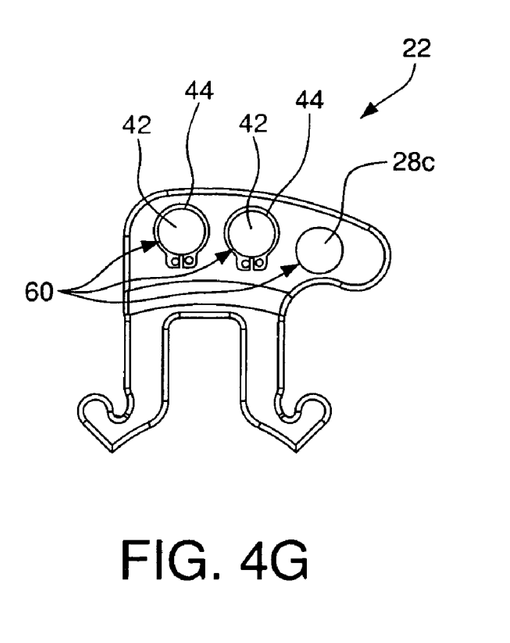
FIG. 4G is a front view of a shoe of the clutch of FIG. 1, showing one weight disposed at the center and one weight disposed at the heel.
Figure 4H:
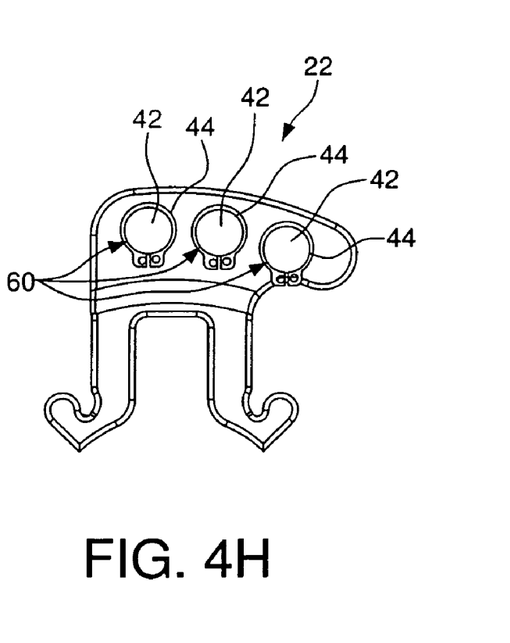
FIG. 4H is a front view of a shoe of the clutch of FIG. 1, showing one weight disposed at the toe, one weight disposed at the center, and one weight disposed at the heel.

The drum contacting member 24 is preferably attached to or formed integral with outer end of each leg 36. The inner end of each leg includes a spring attachment mount 38. As is best illustrated in FIGS. 3A to 3C, each spring attachment mount 38 preferably includes a retention lip with a bulbous or edge portion that is designed to retain an end of a spring 40 on the leg 36. The spring attachment mount 38 forms a seat for one end of a spring 40 that connects a spring attachment mount 38 on one shoe 22 to a spring attachment mount 38 on an adjacent shoe 22. The spring force generated by the springs 40 urges the shoes 22 toward one another. Because the shoes 22 are arranged in a circular pattern to form a rotor 34, the net effect of the springs 40 is to urge the shoes 22 radially inward toward the hub 12.

Figure 5A:
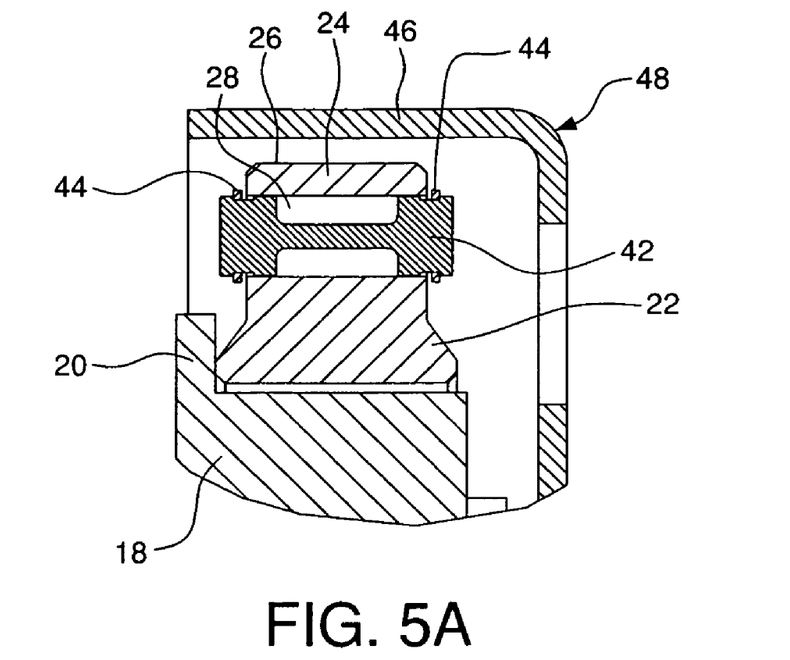
FIG. 5A is a partial sectional view showing a weight having a first mass installed in a shoe of the clutch of FIG. 1.
Figure 5B:
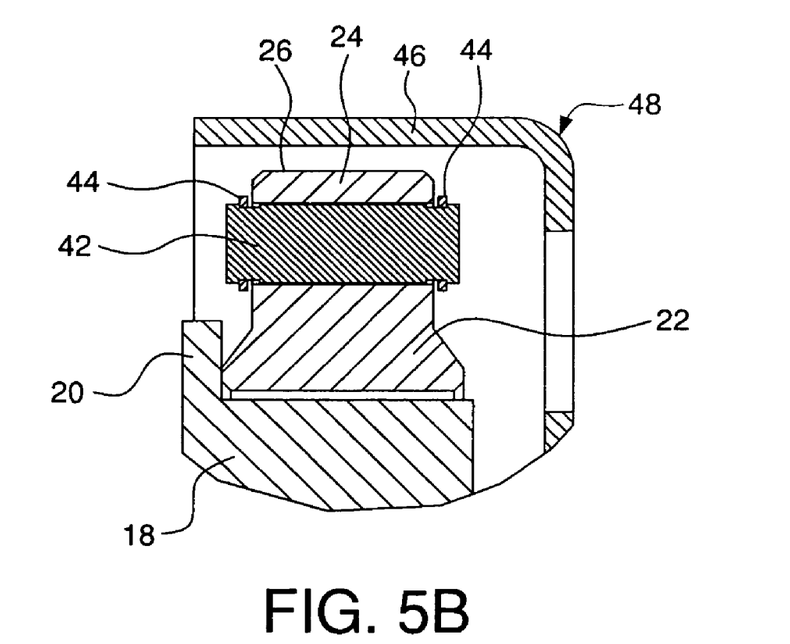
FIG. 5B is a partial sectional view showing a weight having a second mass installed in a shoe of the clutch of FIG. 1.

The drum contact member 24 includes a mass adjustment mechanism 60 that preferably includes one or more cavities. In one embodiment, as illustrated in FIGS. 4A to 4H, the mass adjustment mechanism 60 comprises a plurality of cavities 28, each cavity 28 being adapted to receive a weight 42. In this embodiment, each cavity 28 may be independently left empty or may be filled with a weight 42. Each weight 42 is preferably retained in a cavity 28 using a snap ring or other mechanical retaining means 44. The retaining means 44 secures the weights 42 in the shoes 22 during operation of the clutch 10 but enables the weights 42 to be readily removed or interchanged when the clutch 10 is not in operation. Various weights 42 may be installed into the cavities 28, having different masses or densities or geometries, or being constructed from different materials. For example, two different mass weights 42 are illustrated in FIGS. 5A to 5B. When the same density material is used, the weight 42 shown in FIG. 5A has less mass than the weight 42 shown in FIG. 5B. It can be appreciated that a number of different mass weights 42 adapted to fit into the cavities 28 can be manufactured using different materials and different geometries.

Figure 6A:
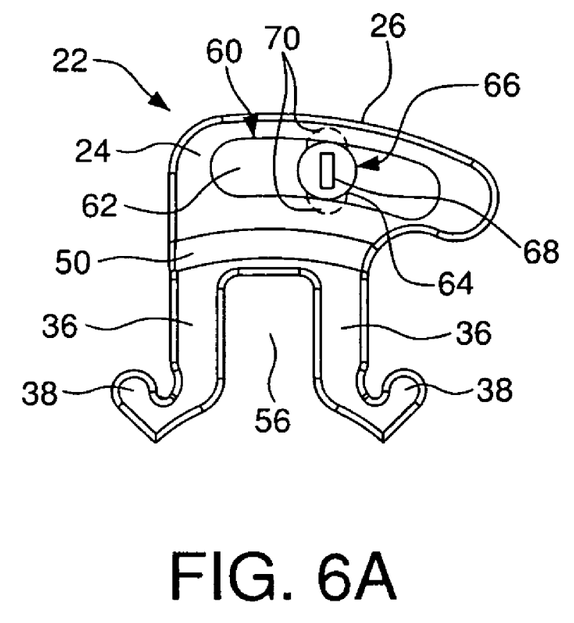
FIG. 6A is a front view of a shoe of the clutch of FIG. 1, showing the mass adjustment mechanism having a weight engaged for operation of the clutch.
Figure 6B:
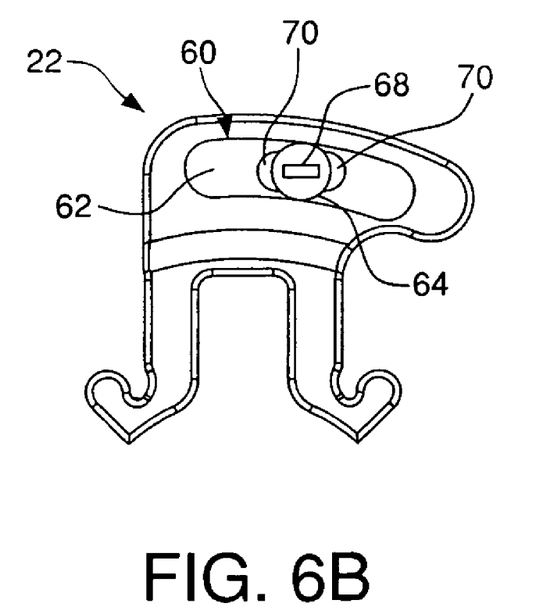
FIG. 6B is a front view of a shoe of the clutch of FIG. 1, showing the mass adjustment mechanism have a weight disengaged for removal from or movement along the shoe.

In another embodiment, as illustrated in FIGS. 6A to 6B, the mass adjustment mechanism 60 comprises a slotted cavity 62 adapted to receive one or more weights 64. Each weight 64 is secured within the cavity 62 at a point along the length thereof by a securing means 66. In one embodiment, the securing means 66 includes one or more retractable tabs 70 actuated by a keyed means 68. When the keyed means 68 is turned in a first direction, the tabs 70 extend outwardly from the weight 64 to engage the inner wall of the cavity 62. When the keyed means 68 is turned in a second direction, the tabs 70 retract inwardly towards the weight 64, permitting the weight 64 to be either removed from the cavity 62 or moved along the cavity 62 to be secured in another location. It can be appreciated that a variety of equivalent mechanical securing means 66 known in the art may be used to accomplish the same function. In yet another embodiment, the mass adjustment mechanism 60 may comprise more than one slotted cavity 62. In still another embodiment, the mass adjustment mechanism 60 may comprise one or more single-weight cavities 28 in combination with one or more slotted cavities 62.

The springs 40 are preferably C-shaped clips. Multiple stiffnesses of C-clip springs 40 may be used, depending on the desired engagement speed and torque capacity of the clutch 10. The C-clip springs 40 may be installed or removed by spreading the arms of the spring 40 apart with a pair of pliers a sufficient amount to disengage the ends thereof from the attachment mounts 38.

The drum 48 is mounted to or otherwise interconnected with an output drive system (not shown), which may include a pulley or gear or other mechanism known in the art. The drum 48 includes a rim 46 which extends axially over the shoes 22. The drum rim 46 has an inner radius that provides a slight clearance between the shoes 22 and the inner surface of the rim 46 when the clutch 10 is disengaged.

The operation of the clutch 10 will now be discussed. When the clutch 10 is disengaged, the springs 40 urge the shoes 22 radially inwardly toward the hub 12 so that a small clearance is present between the drum contact members 24 and the inner surface of the drum rim 46. In this state, the hub 12 and the drum 48 can rotate freely relative to one another, provided that the rotation of the hub 12 is not sufficient to engage the clutch 10. As such, in the disengaged state, no torque is transmitted from the input shaft to the output drive system.

Engagement of the clutch 10 begins to occur when the speed of rotation of the hub 12 is sufficient to generate an outward centrifugal force on the shoes 22 that is greater than the inward force exerted by the springs 40. The centrifugal force urges the shoes 22 radially outwardly toward the drum rim 46. As the shoes 22 move outward, the outer friction surface 26 contacts the inner surface of the drum rim 46. The frictional force generated by that contact transmits torque from the shoe 22 to the drum 48, and consequently from the input shaft to the output drive system.

When the centrifugal force is barely sufficient to overcome the springs 40 to force the shoes 22 into contact with the drum 48, there may be some slippage between the outer friction surface 26 and the inner surface of the drum rim 46. This slippage is not altogether undesirable, and may permit an engine attached to the input shaft to operate in its optimum power band while still transmitting a significant portion of its torque to the output drive system. By tuning a clutch 10 to have a desired amount of slippage at a certain engine speed, a user may maximize the amount of torque that is available to the output drive system. Too much clutch slippage may result in excessive waste of engine power, while too little clutch slippage may cause the engine speed to slow below its optimum power band.

The performance of the clutch 10 may be determined based on several factors that are adjustable in the design of the present invention. The engagement speed of the clutch 10 is dependent upon factors including the mass of the shoes 22 and the strength of the springs 40. Additionally, the quality of the clutch engagement (i.e., whether the shoes 22 initially engage the drum rim 46 more aggressively or more smoothly and how readily the clutch 10 slips), is dependent upon factors including the orientation of each shoe 22 and the mass distribution within each shoe 22. Further, the torque capacity of the clutch 10 is dependent upon factors including the mass of the shoes 22, the strength of the springs 40, the orientation of each shoe 22, and the mass distribution within each shoe 22. Therefore, it can be seen that the various aspects of clutch performance may be interdependent. The present invention provides the ability to readily adjust the clutch engagement speed, the clutch engagement quality, and the clutch torque capacity by varying the mass of the shoes 22, the stiffness or strength of the springs 40, the orientation of each shoe 22, and the mass distribution within each shoe 22.

It is frequently desirable to adjust the engagement speed of a clutch depending on the optimum power band of the motor driving the input shaft and the type of work to be done by the output drive system. The engagement speed of the clutch 10 may be adjusted by varying the mass of one or more shoes 22, by varying the stiffness or strength of one or more springs 40, or by simultaneously varying the mass of one or more shoes 22 and the stiffness or strength of one or more springs 40 in various combinations. The mass of a shoe 22 can be varied by adding a weight 42 to or removing a weight 42 from the mass adjustment mechanism 60. In one embodiment, as is illustrated in FIGS. 4A to 4H, a weight 42 may be added to or removed from any one or more cavities 28 disposed in the drum contact member 24. The weights 42 are preferably substantially cylindrical in shape and are retained in the various cavities 28a, 28b, 28c using the retaining means 44. It can be readily seen that weights 42 may be installed in the drum contact member 24 in eight combinations. Additionally, weights 42 having different densities, masses, geometries, or materials may be used to further multiply the number of combinations available. For example, if two different densities or masses of weights 42 are available, as shown in FIGS. 5A to 5B, at least twenty-seven combinations may be made. In another embodiment, as is illustrated in FIGS. 6A to 6B, one or more weights 42 may be added to or removed from the slotted cavity 62. Numerous combinations of weights 42 having different densities may be installed in the cavity 62.

As the mass of the shoe 22 increases, the centrifugal force created by the rotation of the shoe 22 about the input shaft at a certain speed increases proportionally. Accordingly, for a given spring 40, a heavier shoe 22 will be forced radially outwardly at a lower speed of rotation and will therefore initially engage the drum 48 at a lower speed. The springs 40 can be adjusted to achieve a similar effect. For a given mass of shoe 22, a stiffer spring 40 will provide more resistance to the centrifugal force created by rotation. Consequently, the shoe 22 will require a higher speed of rotation to be forced radially outward and will initially engage the drum 48 at a higher speed.

The quality of the clutch engagement, including the slip characteristics and the aggressiveness of the initial engagement of the clutch 10, may be adjusted by changing the orientation of the shoes 22, by altering the mass distribution within each shoe 22, or by a combination thereof. With reference to FIGS. 4A to 4H and 6A to 6B, the drum contact member 24 of the shoe 22 preferably has an asymmetric geometry, including a toe 30 at one end thereof and a heel 32 at the opposed end thereof. The toe 30 extends circumferentially outwardly from one side of the drum contact member 24 while the heel 32 is substantially aligned with the other side of the drum contact member 24. Additionally, it may readily be seen that an asymmetrical drum contact member 24 may have a toe 30 and a heel 32 both extending circumferentially outwardly with respect thereto, the toe 30 extending outwardly further than the heel 32. In contrast to the asymmetrical drum contact member 24, the support 50 of the shoe 22 is symmetrical with respect to the recess 56 so that the shoe 22 may be alternatively oriented in one of two directions by being clipped by the springs 40 to adjacent shoes 22. The symmetrical support 50 preferably includes a pair of mirror-image legs 36 disposed on either side of the recess 56.

Shoe orientation is defined with respect to the direction of rotation of the hub 12, as indicated in FIGS. 3A to 3C. As shown in FIG. 3A, a "leading shoe" configuration exists when the shoes 22 are installed in leading orientations so that the protruding toe 30 is disposed at the leading edge 52 and the non-protruding heel 32 is disposed at the trailing edge 54. As shown in FIG. 3B, a "trailing shoe" configuration exists when the shoes 22 are installed in trailing orientations so that the heel 32 is disposed at the leading edge 52 and the toe 30 is disposed at the trailing edge 54. And as shown in FIG. 3C, a "hybrid shoe" configuration exists when the shoes 22 are installed in a combination of leading and trailing orientations.

In the leading shoe configuration, the center of mass of the shoe 22 is towards the leading edge 52 of the shoe 22, causing the drum contact member 24 to more aggressively engage with the drum rim 46 when the centrifugal force of rotation reaches the threshold for engagement. Likewise, the leading shoe configuration may be less likely to slip under power from the input shaft. In contrast, in the trailing shoe configuration, the center of mass of the shoe 22 is towards the trailing edge 54 of the shoe 22, causing the drum contact member 24 to more smoothly engage with the drum rim 46 when the centrifugal force of rotation reaches the threshold for engagement. Likewise, the trailing shoe configuration may be more likely to slip under power from the input shaft. In between these two extremes, the hybrid shoe configuration exhibits a mix of aggressive and smooth engagement and slipping characteristics.

The placement of various masses and/or numbers of weights 42 in the shoe 22 may be used to enhance or diminish the effect of the leading or trailing shoe configuration. In one embodiment of the mass adjustment mechanism 60, shown in FIGS. 4A to 4H, the location of the cavities 28 in the drum contact member 24 enables a non-neutral weight distribution in the shoe 22, i.e., a weight distribution that tends to shift the center of mass of the shoe 22 either toward or away from the toe 30 relative to the heel 32. In another embodiment of the mass adjustment mechanism 60, shown in FIGS. 6A to 6B, the span of the slotted cavity 62 enables a similar non-neutral weight distribution in the shoe 22.

The use of any non-neutral weight distribution may change the engagement characteristics of the clutch 10. Installing a weight 42 in the toe cavity 28a while leaving the heel cavity 28c vacant (or, for example, installing a heavier weight 42 in the toe cavity 28a and a lighter weight 42 in the heel cavity 28c) shifts the center of mass of the drum contact member 24 towards the toe 30. The same effect may be achieved by installing one or more weights 42 in the slotted cavity 62 near the toe 30, or by installing one or more heavier weights 42 near the toe 30 and one or more lighter weights 42 near the heel 32. When combined with a leading shoe configuration, a toe-heavy shoe 22 may result in an even more aggressive clutch engagement. When combined with a trailing shoe configuration, a toe-heavy shoe 22 may result in an even softer clutch engagement. Alternatively, installing a weight 42 in the heel cavity 28c while leaving the toe cavity 28a vacant (or, for example, installing a heavier weight 42 in the heel cavity 28c and a lighter weight 42 in the toe cavity 28a) shifts the center of mass of the drum contact member 24 towards the heel 32. The same effect may be achieved by installing one or more weights 42 in the slotted cavity 62 near the heel 32, or by installing one or more heavier weights 42 near the heel 32 and one or more lighter weights 42 near the toe 30. When combined with a leading shoe configuration, a heel-heavy shoe 22 may ameliorate the aggressiveness of the clutch engagement. When combined with a trailing shoe configuration, a heel-heavy shoe 22 may result in a somewhat more aggressive clutch engagement. It can readily be seen that a large number of variations of weights 42 and weight placements in the various cavities 28a, 28b, 28c, or along the slotted cavity 62, may be conceived in combination with leading, trailing, or hybrid shoe configurations to yield nearly limitless adjustment in the engagement characteristics of the clutch 10.

It is frequently desirable to adjust the torque capacity of a clutch depending on the range of horsepower of the motor driving the input shaft and the characteristics of the work to be done by the output drive system. The torque capacity of the clutch 10 may be adjusted by varying the mass of the shoes 22, the stiffness of the springs 40, the orientation of each shoe 22, the mass distribution within each shoe 22, or a combination thereof. The mass of the shoes 22 and the stiffness of the springs 40 may be altered, as previously described. For a given spring 40 and speed of rotation, a heavier shoe 22 will enable the clutch 10 to carry more torque because the centrifugal force driving the shoe 22 radially outwardly against the drum 48 will be proportionately increased compared with the spring force drawing the shoe 22 radially inwardly toward the hub 12. Simply stated, the difference between the outward and inward forces is greater for a heavier shoe 22, all other elements being the same. Accordingly, a larger engagement force between the drum contact member 24 and the drum 48 enables the outer friction surface 26 to carry more torque without slipping against the inner surface of the drum rim 46. Similarly, for a given shoe mass and speed of rotation, a weaker spring 40 will increase the difference between the outward and inward radial forces, thereby increasing torque capacity of the clutch 10.

The shoe orientation and mass distribution with the shoe 22 may be altered, as previously described. The more aggressive leading shoe configuration may cause the drum contact member 24 of the shoe 22 to have more bite when engaging the inner surface of the drum rim 46, enabling the clutch 10 to carry more torque without slipping. As previously discussed with regard to a leading shoe, shifting the shoe mass forward towards the toe 30 will enhance the biting effect while shifting the shoe mass rearward towards the heel 32 will diminish the biting effect. In contrast, the less aggressive trailing shoe configuration may cause the drum contact member 24 of the shoe 22 to have less bite when engaging the inner surface of the drum rim 46, permitting the clutch 10 to slip more easily under the same torque loading. As previously discussed with regard to a trailing shoe, shifting the shoe mass forward towards the heel 32 will ameliorate the softening effect while shifting the shoe mass rearward towards the toe 32 will enhance the softening effect. In between the extremes of the leading and trailing shoe configurations, as previously discussed, are a multitude of hybrid shoe configuration that may exhibit some of the characteristics of both designs.

To summarize, the adjustable parameters in the clutch 10 of the present invention include the mass of the shoes 22, the stiffness of the springs 40, the orientation of each shoe 22, and the mass distribution within each shoe 22. Increasing the mass of a shoe 22 generally decreases the engagement speed of the clutch 10 and increases the torque capacity of the clutch 10. Similarly, decreasing the stiffness of the spring 40 generally decreases the engagement speed of the clutch 10 and increases the torque capacity of the clutch 10. Moreover, altering the mass of the shoe 22 may also alter the mass distribution within the shoe 22, accordingly affecting the clutch performance. A shoe 22 orientated with the toe 30 at the leading edge 52 exhibits more aggressive engagement and less slippage than a shoe 22 oriented with the heel 32 at the leading edge 52. Modification of the mass distribution within the shoe 22 can enhance or diminish this effect, depending on whether the mass balance is shifted forward towards the leading edge 52 or rearward towards the trailing edge 54.

In view of the foregoing discussion of the means by which the clutch characteristics may be adjusted, it is readily apparent to one skilled in the art that the various parameters may be altered in a wide variety of combinations, provided the chosen combination results in an even balance or rotational symmetry of the rotor 34 about the hub 12. For this reason, an embodiment having four shoes 22 is preferred, because it provides the ability to mix and match combinations of shoe geometries, weights 42, and springs 40. In one example shown in FIG. 3A, the clutch 10 includes two diametrically opposed shoes 22 having three weights 42 installed therein and two diametrically opposed shoes 22 having only two weights 42 installed therein. The rotor 34 is still rotationally balanced, and in this configuration has pairs of shoes 22 exhibiting two different sets of engagement characteristics. In another example shown in FIG. 3B, the clutch 10 includes two diametrically opposed springs 40 having a lighter spring force and two diametrically opposed springs 40 having a heavier spring force. The rotor 34 is still rotationally balanced, and in this configuration, the springs 40 impart two different sets of engagement characteristics to the paired alternating shoes 22. In yet another example shown in FIG. 3C, the clutch 10 includes a pair of diametrically opposed leading shoes 22 and a pair of diametrically opposed trailing shoes 22. As in the other examples, the rotor 34 is still rotationally balanced, and in this configuration, the leading and trailing shoes 22 exhibit two different sets of engagement characteristics. Other similar variations and combinations are readily envisioned.

Notwithstanding the advantages of a clutch 10 having four shoes 22, a clutch 10 having a number of shoes 22 other than four, including quantities of two or three, may be adjusted by use of the same parameters, if perhaps in less combinations. Note, however, that clutches 10 having even numbers of shoes 22 greater than four (i.e, six, eight, ten, etc.) are equally as variable as the four-shoed clutch but may be less practical in small clutch designs due to size constraints. The primary limitation regarding the adjustability of a clutch 10 having either two or an odd number of shoes 22 is that whatever adjustment is made to one shoe 22 should be made to all shoes 22 so that rotational balance is maintained. Otherwise, the weight of the shoes 22, the strength of the springs 40, the orientation of the shoes 22, and the mass distribution within the shoes 22, can all be adjusted, individually or in combination, in clutches having two or an odd number of shoes 22 in order to modify the performance characteristics of the clutch 10.

The foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A centrifugal clutch comprising:
a driver adapted to engage an input shaft, the driver having a rotational axis and a plurality of radial teeth each extending outwardly;
a drum coaxial with the driver and adapted to engage a driven component;
a plurality of shoes located between the driver and the drum and arranged about the axis, the shoes each being radially movable along a corresponding radial axis between an outward position in which the shoes contact a surface of the drum and an inward position in which the shoes are spaced apart from the drum, each shoe comprising;
a drum contacting member which is adapted to contact a portion of the drum, the drum contacting member having a leading edge extending circumferentially in one direction from the radial axis and a trailing edge extending circumferentially in an opposite direction from the radial axis, the drum contacting member further having a mass adjustment mechanism for tuning the engagement characteristics of the clutch by adjusting a center of mass of the shoe with respect to the leading and trailing edges; and
a support having one end attached to the drum contacting member and the other end extending radially inward and having a recess engaged by a corresponding one or more of the radial teeth such that when the shoe moves to the outward position the shoe rotates slightly with respect to the radial axis in response to the center of mass of the shoe, the support including a pair of spring attachment mounts formed on the radially inward end thereof;
wherein when the center of mass is toward the leading edge of the shoe, the leading edge contacts the drum before the trailing edge, causing the clutch to exhibit more aggressive engagement with the drum and causing an increase in the torque that can be carried by the clutch before slipping; and
wherein when the center of mass is toward the trailing edge of the shoe, the trailing edge contacts the drum before the leading edge, causing the clutch to exhibit less aggressive engagement with the drum and causing a decrease in the torque that can be carried by the clutch before slipping; and
a plurality of springs, each spring engaging two adjacent shoes by attaching to one spring attachment mount on each shoe, the spring biasing the shoes toward one another.

2. A centrifugal clutch according to claim 1, wherein the drum contacting member is asymmetrically shaped having a toe extending circumferentially outwardly from one side of the support.

3. A centrifugal clutch according to claim 2, wherein the mass adjustment mechanism includes one or more cavities each adapted to receive at least one weight, the cavities being spaced apart circumferentially.

4. A centrifugal clutch according to claim 2, wherein the toes of the shoes are oriented toward the direction of rotation of the driver.

5. A centrifugal clutch according to claim 2, wherein the toes of the shoes are oriented away from the direction of rotation of the driver.

6. A centrifugal clutch according to claim 2, wherein there are an even number of the shoes.

7. A centrifugal clutch according to claim 6, wherein at least two diametrically opposed shoes have toes oriented toward the direction of rotation of the driver and at least two diametrically opposed shoes have toes oriented away from the direction of rotation of the driver.

8. A centrifugal clutch according to claim 6, wherein there are four shoes.

9. A centrifugal clutch according to claim 1, wherein the mass adjustment mechanism includes one or more cavities asymmetrically positioned with respect to the radial axis and at least one weight adapted to be removably inserted into one of the cavities.

10. A centrifugal clutch according to claim 9, wherein the mass adjustment mechanism includes three cavities each adapted to receive the weight, and wherein the weight is in one of the cavities.

11. A centrifugal clutch according to claim 1, wherein the mass adjustment mechanism includes an aperture and at least one weight removably retained in the aperture, the weight being movable for adjusting the center of mass of the shoe.

12. A centrifugal clutch according to claim 1, wherein:
the recess is bounded by a pair of legs depending radially inwardly from opposite sides of the support, one spring attachment mount being formed on the radially inward end of each leg; and
the at least one radial tooth is tapered so as to be slightly narrower in the radially outward direction.

13. A centrifugal clutch comprising:
a driver adapted to engage an input shaft, the driver having a rotational axis and a plurality of slightly tapered radial teeth extending outwardly;
a drum coaxial with the driver and adapted to engage a driven component;
a plurality of shoes located between the driver and the drum and arranged about the axis, the shoes being radially movable between an outward position in which the shoes contact a surface of the drum and an inward position in which the shoes are spaced apart from the drum, each shoe comprising:
an asymmetrically shaped drum contacting member which is adapted to contact a portion of the drum, the drum contacting member having a toe extending circumferentially outwardly from one side of the shoe, the drum contacting member having a mass adjustment mechanism for tuning the engagement characteristics of the clutch by adjusting a center of mass of the drum contacting member toward or away from the toe, thereby causing the shoe to rotate slightly relative to the radial axis to pivot the toe toward or away from the drum, respectively, when the driver is rotated about the rotational axis; and a support having one end attached to the drum contacting member and the other end extending radially inward and having a recess engaged by a corresponding one or more of the radial teeth of the driver, the support including a pair of spring attachment mounts formed on the radially inward end thereof; and a plurality of springs, each spring engaging two adjacent shoes by attaching to one spring attachment mount on each shoe, the spring biasing the shoes toward one another.

14. A centrifugal clutch according to claim 13, wherein the toes of the shoes are oriented toward the direction of rotation of the driver;

wherein when the center of mass of the drum contacting member is toward the toe of the shoe, the shoe exhibits more aggressive engagement with the drum and causes an increase in the torque that can be carried by the clutch before slipping; and wherein when the center of mass of the drum contacting member is away from the toe of the shoe, the shoe exhibits less aggressive engagement with the drum and causes a decrease in the torque that can be carried by the clutch before slipping.

15. A centrifugal clutch according to claim 13, wherein the toes of the shoes are oriented away from the direction of rotation of the driver;

wherein when the center of mass of the drum contacting member is toward the toe of the shoe, the shoe exhibits less aggressive engagement with the drum and causes an increase in the torque that can be carried by the clutch without slipping; and wherein when the center of mass of the drum contacting member is away from the toe of the shoe, the shoe exhibits more aggressive engagement with the drum and causes a decrease in the torque that can be carried by the clutch without slipping.

16. A centrifugal clutch according to claim 13, wherein there are an even number of the shoes.

17. A centrifugal clutch according to claim 16, wherein at least two diametrically opposed shoes have toes oriented toward the direction of rotation of the driver and at least two diametrically opposed shoes have toes oriented away from the direction of rotation of the driver.

18. A centrifugal clutch according to claim 16, wherein there are four shoes.

19. A centrifugal clutch according to claim 13, wherein the mass adjustment mechanism includes one or more cavities each adapted to receive at least one weight, the cavities being spaced apart circumferentially.

20. A centrifugal clutch according to claim 19, wherein the mass adjustment mechanism includes three cavities and at least one weight adapted to be removably inserted into one of the cavities.

21. A centrifugal clutch according to claim 19, wherein the mass adjustment mechanism includes an aperture and at least one weight removably retained in the aperture, the weight being movable for adjusting the center of mass of the shoe.

22. A centrifugal clutch according to claim 13, wherein:

the support comprises a pair of minor-image legs depending radially inwardly from opposite sides of the support, the recess being formed therebetween, one spring attachment mount being formed on the radially inward end of each leg, the legs enabling each shoe to be interchangeably oriented with the toe facing either toward the direction of rotation of the driver or away from the direction of the driver; and the load transfer between the shoes and the driver is provided by the contact between the teeth and the support.

23. A centrifugal clutch according to claim 22, wherein there are four shoes and the driver correspondingly has four teeth.

* * * * *